Figure 1:
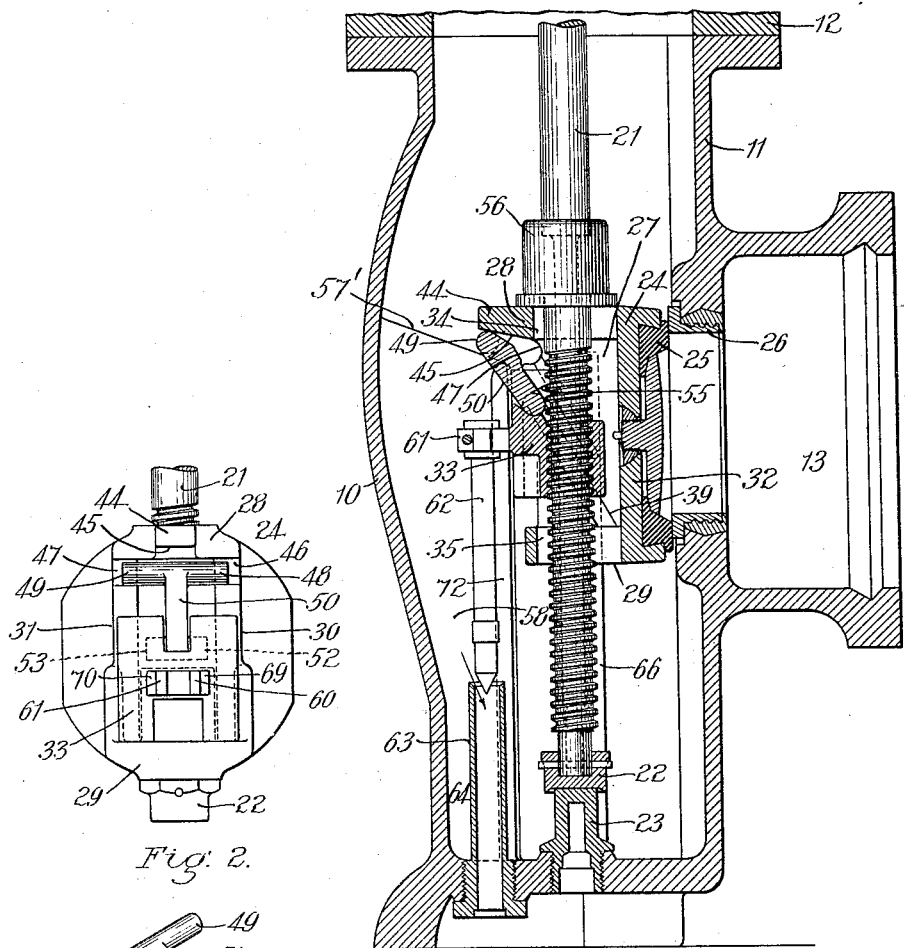

G. S. WALKER.
VALVE FOR HYDRANTS.
APPLICATION FILED FEB. 3, 1912.

1,056,860.

Patented Mar. 25, 1913.

2 SHEETS—SHEET 1.

Witnesses.
Franklin E. Low
John Hutchison

Inventor:
George S. Walker,
by his attorney
Charles V. Gooding

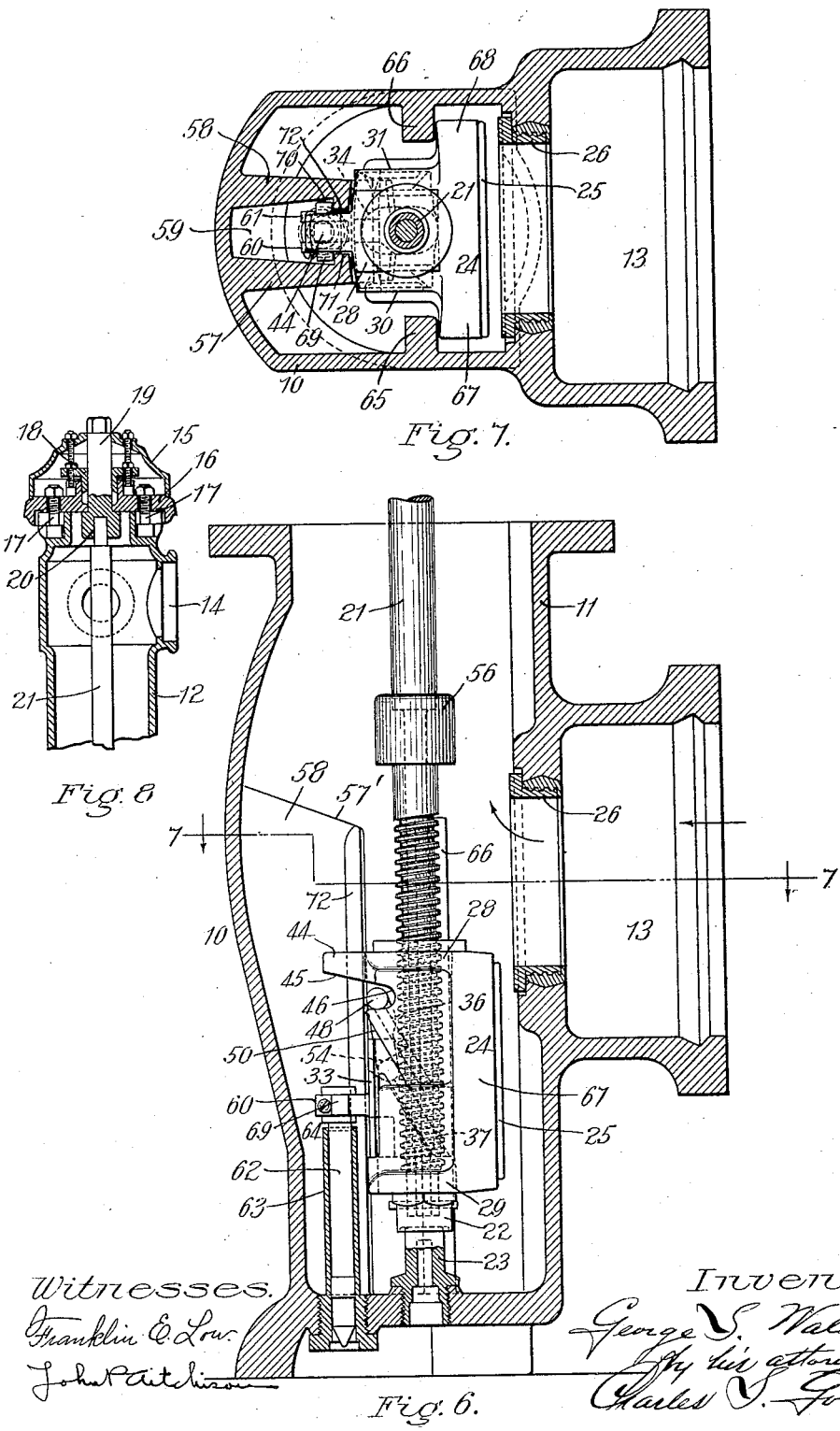

UNITED STATES PATENT OFFICE.

GEORGE S. WALKER, OF BOSTON, MASSACHUSETTS.

VALVE FOR HYDRANTS.

1,056,860.      Specification of Letters Patent.      Patented Mar. 25, 1913.

Application filed February 3, 1912. Serial No. 675,139.

*To all whom it may concern:*

Be it known that I, GEORGE S. WALKER, a citizen of the United States, residing at Dorchester, Boston, in the county of Suffolk and State of Massachusetts, have invented new and useful Improvements in Valves for Hydrants, of which the following is a specification.

This invention relates to an improved valve and means for operating the same, especially adapted to be used in connection with hydrants, and being of that type known as a "gate" valve.

The object of the invention is to provide a drip valve for the hydrant which shall be opened and closed by the mechanism which opens and closes the gate valve.

The object of the invention is further to provide a mechanism which will positively move the gate valve away from the seat in a direction substantially perpendicular thereto and transversely of the stem which operates said valve and subsequently to move the valve longitudinally of said stem and downwardly below the mouth of the inlet pipe.

In the present instance, the device is so constructed and arranged that by the rotation of the valve stem the gate valve will first be moved horizontally away from its seat, then downwardly vertically out of alinement with the inlet orifice and simultaneously with this downward movement the drip valve will be closed. Upon reversing the rotation of the valve stem the drip valve will be opened and simultaneously with its opening movement the gate valve will be raised to a position in alinement with its seat and with the inlet orifice and will then be moved horizontally into contact with its seat. By this operation of the valve it will be seen that said valve will be moved away from the seat and down out of alinement with the inlet orifice without scraping the same along the face of the seat and injuring the soft rubber cushion ordinarily used in valves of this class to bear against the seat thereof. The same will be true of the return or closing movement of the valve, the horizontal movement in each case taking place independently of the vertical movement. Then upon further rotation of the valve stem, the gate valve will be moved horizontally into engagement with its seat and thus close the inlet orifice.

The present invention is an improvement upon a valve for hydrants patented by me February 28, 1899, No. 620,386, and among other features the improvements consist in moving the gate valve horizontally toward or away from its seat positively and without depending upon the pressure of the water at the inlet orifice, whereas in the invention embodied in said Letters Patent the horizontal movement of the valve away from its seat was accomplished by the pressure of the water at the inlet orifice. In the present case the valve stem and all that is supported thereon is supported upon a fixed pedestal or step at the bottom of the valve stem and said valve stem rests permanently upon said step and has no longitudinal movement relatively thereto, whereas in said patent the drip valve for the hydrant is located just beneath the lower end of the valve stem and the valve stem has to move longitudinally in order to open said drip valve. This was very inconvenient and somewhat impracticable in the form of my invention embodied in said patent and gave considerable trouble in practical operation.

In the present instance, the drip valve is operated entirely independent of any longitudinal movement of the valve stem. Moreover, the valve stem and the instrumentalities connected therewith resting upon said step are capable of being nicely adjusted by means of said step which has screw-threaded adjustment in the casing of the hydrant, and this makes it possible to adjust the instrumentalities whereby a horizontal movement is imparted to the valve with nicety.

The invention consists in the combination and arrangement of parts set forth in the following specification and particularly pointed out in the claims thereof.

Figure 3:
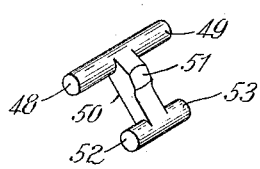
Figure 4:
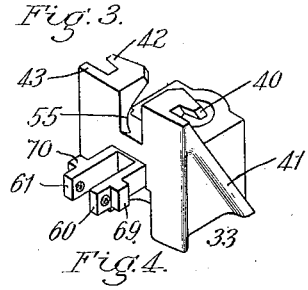

Referring to the drawings: Figure 1 is a sectional elevation of the lower part of a hydrant showing the gate valve closed and the drip valve open. Fig. 2 is a rear elevation of the gate valve, nut and the link connecting the nut to the gate valve. Fig. 3 is a perspective view of said link. Fig. 4 is a perspective view of the nut. Fig. 5 is a perspective view of the valve. Fig. 6 is a sectional elevation, similar to Fig. 1, showing the gate valve in its lowermost position and the drip valve closed. Fig. 7 is a sectional plan taken on line 7—7 of Fig. 6. Fig. 8 is a sectional elevation of the upper part of the hydrant showing the outlet orifice, a portion of the valve stem and the shaft by means of which said valve stem is rotated. Fig. 8 is shown on a reduced scale as compared with Figs. 1, 6 and 7, in order to save space in the drawings, this portion of the hydrant being substantially the same as illustrated in Fig. 1 of said Letters Patent.

Like numerals refer to like parts throughout the several views of the drawings.

In the drawings, 10 is the casing of the hydrant. Said casing is preferably made in two parts 11 and 12, the part 11 having an inlet orifice 13 therein and the part 12 having an outlet orifice 14.

15 is the cover, 16 the packing plate which is fast to the upper part 12 by bolts 17, 17. 18 is the stuffing box.

The shaft 19 is rotatably mounted in the cover 15 and in the packing plate 16, and has an orifice 20 at its lower end into which the upper end of a valve stem 21 projects, said upper end of the valve stem being rectangular in cross section in order that it may be readily connected to the shaft 19 and rotated thereby. The lower end of the valve stem 21 has a collar 22 fast thereto which rests permanently upon the upper end of a step 23. Said step 23 has screw-threaded engagement with the bottom of the lower part 11 of the hydrant casing, so that by turning the nuts upon the bolts 17, 17 and turning the step 23, the valve stem 21 may be adjusted together with the parts attached thereto longitudinally thereof.

The valve 24 is of the type known as a "gate" valve and is preferably provided with a resilient cushion 25 which is adapted to bear against the seat 26 fast to the part 11 of the hydrant casing when the valve is closed, as seen in Fig. 1. Said valve has a chamber 27 therein having an upper wall 28, a lower wall 29, two side walls 30 and 31 and a front wall 32 constituting a gate.

A nut 33 is located in the chamber 27, the same being shown in perspective in Fig. 4, and has screw-threaded engagement with the valve stem 21. Said valve stem extends through slots 34 and 35 located in the upper wall 28 and the lower wall 29, respectively, said slots being of sufficient extent to allow the valve 24 to be moved toward and away from its seat in a horizontal direction.

The valve 24 is provided in the walls 30 and 31 with inclined grooves 36, 37 and 38, 39 respectively. The nut 33 is provided with correspondingly inclined projections 40 and 41 which project, respectively, into the grooves 36 and 37 and with inclined projections 42 and 43 which project, respectively, into the slots 38 and 39.

The upper wall 28 is provided with a rearwardly extending ear 44 having an inclined lower surface 45. The walls 30 and 31 are provided with recesses or notches 46 and 47, respectively, which are adapted to receive the lateral projections 48 and 49, respectively of a link 50. Said link is provided with a cam-shaped projection 51 upon its inner edge and is also provided with lateral projections 52 and 53 at its lower end which are adapted to enter notches 54 and 55, respectively, in the nut 33.

A stop-collar 56 is provided upon the valve stem 21 to limit the distance to which the valve 24 can be moved upwardly. The lower part 11 of the casing 10 is provided with vertically disposed guides 57, 58 which upon their inner faces are substantially parallel to said valve stem and terminate at their upper ends in inclined edges 57′. The guides 57 and 58 are separated one from the other by a slot 59. When the parts are in the position illustrated in Fig. 6, the valve being in its lowered position, the ear 44 projects into the slot 59 between the guides 57 and 58 and thus the valve 24 is prevented from rotating. The nut 33 has ears 60 and 61 projecting rearwardly therefrom into said slot 59 and to said ears is connected a valve stem 62 constituting a plunger which projects downwardly into the casing 63 of the drip valve 64. The lower part of the casing 64 has screw-threaded engagement with the bottom of the part 11 of the hydrant casing, so that as said nut is raised and lowered, as hereinafter described, the plunger 62 will move with it, alternately opening and closing the drip valve as illustrated in Figs. 1 and 6, respectively. When the parts are in the position illustrated in Fig. 6 the link 50 is in a practically vertical position, with the projections 48 and 49 in their respective notches 46 and 47 in the valve 24 and with the lateral projections 52 and 53 of said link in their respective notches 54 and 55 in the nut 33, said lateral projections 48 and 49 resting against the inner faces or ends of the guide ribs 57 and 58, respectively. The lower part 11 of the casing is provided with two other ribs or guides 65 and 66 and the front portion of the valve 24 has flanges 67 and 68 which project laterally into said casing adjacent to said flanges 65 and 66, thus preventing the valve from rotating upon the stem, and the ear 44 projecting between the guides 56 and 57 also guards against rotation of the valve upon its stem, while the nut 33 is prevented from rotating on the stem by the ribs 57 and 58, so that as the stem 21 is guarded against longitudinal movement when said stem is rotated, the screw-threaded portion thereof will cause the nut 33 to move vertically upwardly or downwardly along said stem.

The general operation of the device hereinbefore specifically described is as follows: Assuming the parts to be in the relative positions illustrated in Fig. 1, that is, with the gate valve closed and with the drip valve open, the stem 21 is rotated in the proper direction by means of a wrench applied to the upper end thereof and the nut 33 will be moved from the position illustrated in Fig. 1 to that illustrated in Fig. 6. During the first part of said movement, said nut will cause the valve 24 to be drawn away from its seat in a horizontal direction, by reason of the lateral projections 40, 41 and 42, 43 moving downwardly in the inclined grooves 36, 37 and 38, 39, respectively. As the nut cannot move laterally of the stem, it follows that the valve must be moved laterally or transversely thereof and thus drawn away from its seat. It is prevented, during the first part of this operation, from moving in a vertical direction by the link 50, the lateral projections 48 and 49 resting upon the inclined upper edges 57' of the guides 57 and 58. These lateral projections are interposed between said upper edges and the inclined lower face 45 of the ear 44, so that the valve cannot move downwardly until said lateral projections 48 and 49 are drawn into the notches 46 and 47 of the valve 24. By that time the valve has been drawn away from its seat in a horizontal direction and when said lateral projections 48 and 49 have left the upper edges of the guides 57 and 58 and entered the notches 46 and 47, upon further rotation of the stem 21 the valve will begin its downward movement and the lateral projections 48 and 49 will slide along the inner face of the ribs 57 and 58, as illustrated in Fig. 6. At the same time during the downward movement of the nut 33 the plunger 62 of the drip valve 64 will be lowered into the casing 63 and close said drip valve. The valve 24 can be lowered until the bottom wall 29 thereof abuts against the top of the collar 22. Upon reversing the direction of rotation of the stem 21, the valve 24 will move upwardly until the upper wall 28 abuts against the under side of the collar 56, whereupon vertical movement of said valve is stopped, and upon a further rotation of the screw the nut 33 will continue its upward movement and the valve 24 will be forced toward its seat by the projections 40, 41 and 42, 43 upon the nut 33 working in their respective grooves in the valve 24 and bearing against the walls of said grooves. During this latter part of the upward movement of the nut 33 the valve is prevented from moving downwardly by the lateral projections on the link 50 which project beneath the inclined surface 45 upon the lower side of the ear 44 and rest upon the upper inclined edges 57' of the guides 57 and 58. Thus the valve is moved horizontally toward its seat until the rubber cushion 25 contacts therewith and is pressed firmly thereagainst. The water that remains in the hydrant casing will flow outwardly through the drip valve casing 63 until the level of the top of said drip valve casing has been reached. The small amount of water left in the bottom of the casing is immaterial, as it cannot freeze being always located beneath the freezing point of the ground.

It will be noted that by the adjustment of the step 23 the valve stem 21 may be raised or lowered and thus the relative location of the valve and stem, especially of the under side of the ear 44 on said valve, may be determined.

It will be understood that by reason of the projections 40 and 41 extending into the grooves 36 and 37, respectively, and the projections 42 and 43 extending into the grooves 38 and 39, respectively, in the valve 24, that said valve, during the downward movement of said nut longitudinally of the stem, is positively moved away from its seat and does not depend upon the pressure of the water to force it away from its seat, and that during the latter part of the upward movement of said nut the valve 24 is positively moved toward its seat.

It will be understood from the general and specific description of the device hereinbefore set forth that when the nut 33 is moving downwardly in the first part of its downward movement, in order to draw the valve away from its seat, there is a certain pull upon said nut tending to move the same laterally of the stem and toward said valve seat, and this pull is resisted by the valve stem itself and is further resisted by two lateral projections 69 and 70 which are adapted to engage other lateral projections 71 and 72 on the ribs 57 and 58, respectively. Thus any tendency of the nut to be drawn toward the valve seat or toward the right in Figs. 1, 6 and 7 of the drawings is counteracted by the ears 69 and 70 contacting with the ears 71 and 72 upon the fixed casing.

Having thus described my invention, what I claim and desire by Letters Patent to secure is:

1. A device of the character described having, in combination, a casing provided with an inlet and an outlet orifice, a valve seat adjacent to said inlet orifice, a valve, a valve stem rotatably mounted in said casing and stationary as to longitudinal movement therein, said valve slidable on said stem transversely thereof toward and away from said seat, means to prevent said valve from rotating, a nut having screw-threaded engagement with said stem, means to prevent said nut from rotating, said nut having projections thereon adapted to project into inclined grooves in said valve, means interposed between said valve and nut to prevent said valve from moving longitudinally of said stem, whereby when said valve stem is rotated said valve will be positively moved toward or away from said seat and substantially at right angles thereto, and a drip valve adapted to be operated by said nut, whereby said drip valve may be alternately closed and opened.

2. A device of the character described having, in combination, a casing provided with an inlet and an outlet orifice, a valve seat adjacent to said inlet orifice, a valve, a valve stem rotatably mounted in said casing and stationary as to longitudinal movement therein, said valve slidable on said stem transversely thereof toward and away from said seat, means to prevent said valve from rotating, a nut having screw-threaded engagement with said stem, projections on said nut extending transversely of and away from said valve stem and into a slot in said casing, said nut having projections thereon adapted to project into inclined grooves in said valve, means interposed between said valve and nut to prevent said valve from moving longitudinally of said stem, said means adapted to be moved by said nut, to allow said valve to be moved longitudinally of said stem and to lock said valve to said nut, whereby when said valve stem is rotated said valve will be positively moved toward or away from said seat and subsequently moved longitudinally of said stem, and a drip valve adapted to be operated by the projections on said nut to alternately close and open the same.

3. A device of the character described having, in combination, a casing provided with an inlet and an outlet orifice, a valve seat adjacent to said inlet orifice, a valve, a valve stem rotatably mounted in said casing and stationary as to longitudinal movement therein, said valve slidable on said stem transversely thereof toward and away from said seat, means to prevent said valve from rotating, a nut having screw-threaded engagement with said stem, projections on said nut extending transversely of and away from said valve stem and into a slot in said casing, ears extending laterally from said transversely extending projections and lateral projections on said casing between said ears and said valve constituting guides adapted to be engaged by said ears to guide said nut, said nut having projections thereon adapted to project into inclined grooves in said valve, means adapted to lock said valve to said nut, whereby upon rotating said valve stem, said valve will be moved longitudinally of said stem, and means adapted to subsequently actuate said locking means to unlock said valve from said seat and prevent said valve from moving longitudinally of said stem, whereby upon rotation of said stem said valve will be positively moved toward said seat and substantially at right angles thereto.

4. A device of the character described having, in combination, a casing, a valve seat, a gate valve, a valve stem, means actuated by the rotation of said valve stem and including a nut having screw-threaded engagement with said valve stem, adapted to move said gate valve first transversely of said stem away from said seat and subsequently longitudinally of said stem and second longitudinally of said stem and subsequently transversely thereof toward and into contact with said seat and a drip valve adapted to be operated by said nut whereby said drip valve may be alternately closed and opened.

5. A device of the character described having, in combination, a casing, a valve seat, a gate valve, a valve stem, a drip valve having an outlet orifice leading out of the bottom of said casing, said drip valve embodying in its construction a casing, a plunger movable longitudinally within said casing substantially parallel to said stem and connected to said valve, means actuated by the rotation of said valve stem to move said gate valve first transversely of said stem away from said seat and subsequently longitudinally of said stem and second longitudinally of said stem and subsequently transversely thereof toward and into contact with said seat and whereby said plunger may be alternately moved to close and open said drip orifice.

6. A device of the character described having, in combination, a casing having an inlet and an outlet orifice, a valve seat adjacent to said inlet orifice, a valve, a valve stem rotatably mounted in said casing, a step at the lower end of said casing against which said stem permanently rests, said stem being stationary as to longitudinal movement, said valve slidable on said stem transversely thereof toward and away from said seat, means to prevent said valve from rotating, a nut having screw-threaded engagement with said stem, means to prevent said nut from rotating, said nut having projections thereon adapted to project into inclined grooves in said valve, means interposed between said valve and nut to prevent said valve from moving longitudinally of said stem, whereby when said valve stem is rotated said valve will be positively moved toward or away from said seat and substantially at right angles thereto, and a drip valve adapted to be operated by said nut, whereby said drip valve may be alternately closed and opened.

7. A device of the character described having, in combination, a casing provided with an inlet and an outlet orifice, a valve seat adjacent to said inlet orifice, a valve, a valve stem rotatably mounted in said casing and stationary as to longitudinal movement therein, said valve slidable on said stem transversely thereof toward and away from said seat, means to prevent said valve from rotating, a nut having screw-threaded engagement with said stem, means to prevent said nut from rotating, said nut having projections thereon adapted to project into inclined grooves in said valve and means interposed between said valve and nut to prevent said valve from moving longitudinally of said stem, a pedestal at the lower end of said casing against which said stem permanently rests, means to adjust said pedestal longitudinally of said stem, whereby the relative location of said instrumentalities for imparting lateral movement to said valve relatively to said stem may be determined, and a drip valve adapted to be operated by said nut, whereby said drip valve may be alternately closed and opened.

8. In a device of the character described, a casing having an inlet and an outlet orifice, a valve seat adjacent to said inlet orifice, a valve, a valve stem rotatably mounted in said casing and stationary as to longitudinal movement, said stem extending through said valve substantially parallel to said seat, a nut having screw-threaded engagement with said valve stem, said nut having laterally inclined projections thereon adapted to project into inclined grooves in said valve, a guide in said casing against which said nut is adapted to bear, a link connected at its lower end to said nut and detachably connected at its upper end to said valve, said valve slidable transversely of said stem, means to prevent said valve from rotating on said stem, a stop adapted to limit the upward movement of said valve on said stem, means adapted to disconnect said upper end of said link from said valve, whereby said valve may be alternately and positively moved first transversely of said stem away from said seat and subsequently longitudinally of said stem and second moved longitudinally of said stem and subsequently transversely thereof toward and into contact with said seat, and a drip valve adapted to be operated by said nut, whereby said drip valve may be alternately closed and opened.

9. In a device of the character described, a casing having an inlet and an outlet orifice, a valve seat adjacent to said inlet orifice, a valve, a valve stem rotatably mounted in said casing and stationary as to longitudinal movement, said stem extending through said valve substantially parallel to said seat, a nut having screw-threaded engagement with said valve stem, said nut having laterally inclined projections thereon adapted to project into inclined grooves in said valve, vertically disposed guides in said casing with a slot therebetween, against which guides said nut is adapted to bear, the upper ends of said guides being inclined, a link having lateral projections thereon whereby it is connected at its lower end to said nut and detachably connected at its upper end to said valve, said valve slidable transversely of said stem, an ear on said valve projecting into said slot between said guides, the under side of said ear being inclined, a stop on said stem adapted to limit the upward movement of said valve on said stem, the upper end of said link adapted to engage said inclined under side of said ear and to be thereby disconnected from said valve and the lateral projections on the upper end of said link moved into engagement with the inclined upper ends of said guides, whereby said valve may be alternately and positively moved first transversely of said stem away from said seat and subsequently longitudinally of said stem and second moved longitudinally of said stem and subsequently transversely thereof toward and into contact with said seat, and a drip valve adapted to be operated by said nut, whereby said drip valve may be alternately closed and opened.

10. A device of the character described having, in combination, a casing provided with an inlet and an outlet orifice, a valve seat adjacent to said inlet orifice, a valve, a valve stem rotatably mounted in said casing and stationary as to longitudinal movement therein, said valve slidable on said stem transversely thereof toward and away from said seat, means to prevent said valve from rotating, a nut having screw-threaded engagement with said stem, means to prevent said nut from rotating, said nut having projections thereon adapted to project into inclined grooves in said valve, means interposed between said valve and nut to prevent said valve from moving longitudinally of said stem, guides on said casing adapted to be engaged by said nut to prevent the same from moving laterally with relation to said stem, and a drip valve adapted to be operated by said nut, whereby said drip valve may be alternately closed and opened.

In testimony whereof I have hereunto set my hand in presence of two subscribing witnesses.

GEORGE S. WALKER.

Witnesses:
CHARLES S. GOODING,
SYDNEY E. TAFT.

---

Copies of this patent may be obtained for five cents each, by addressing the "Commissioner of Patents, Washington, D. C."